Aug. 21, 1951     E. C. KARP     2,565,431
COMPUTING SPRING SCALE
Filed Nov. 5, 1945     8 Sheets-Sheet 1
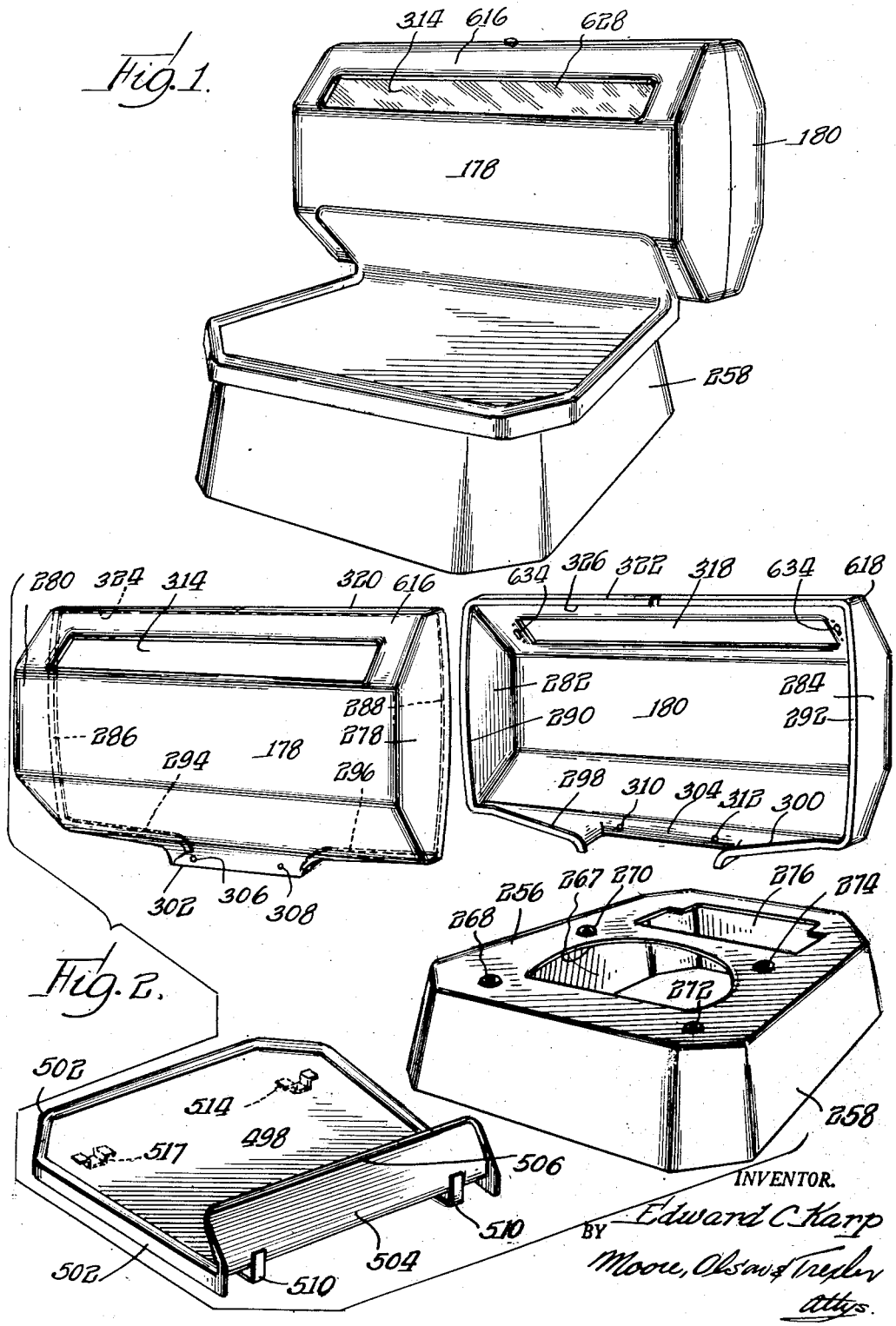
INVENTOR.
Edward C. Karp
BY Moore, Olson & Trexler
Attys.

Aug. 21, 1951
E. C. KARP
2,565,431
COMPUTING SPRING SCALE
Filed Nov. 5, 1945
8 Sheets-Sheet 2
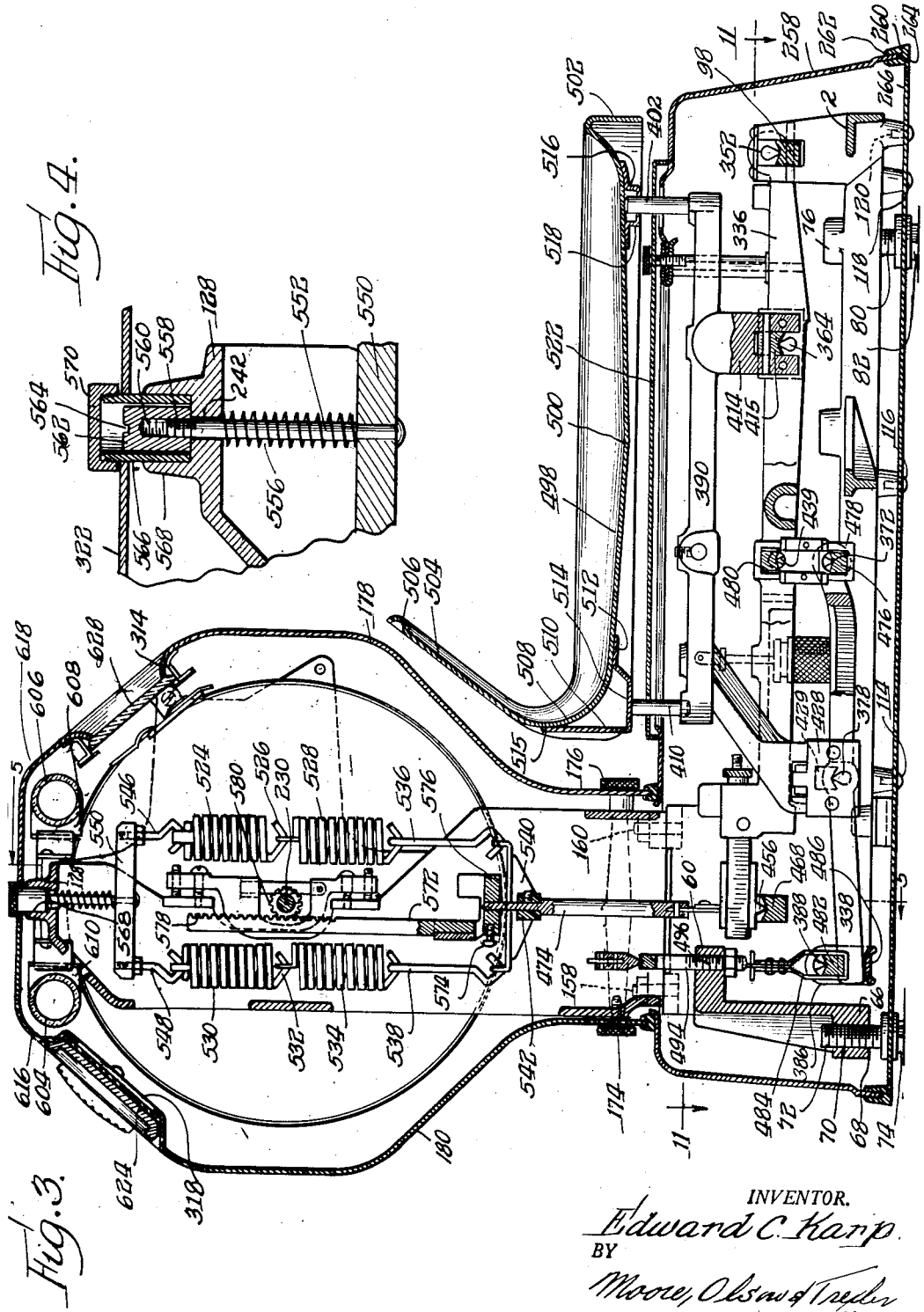
INVENTOR.
Edward C. Karp
BY
Moore, Olson & Trexler
attys.

Aug. 21, 1951
E. C. KARP
2,565,431
COMPUTING SPRING SCALE
Filed Nov. 5, 1945
8 Sheets-Sheet 3
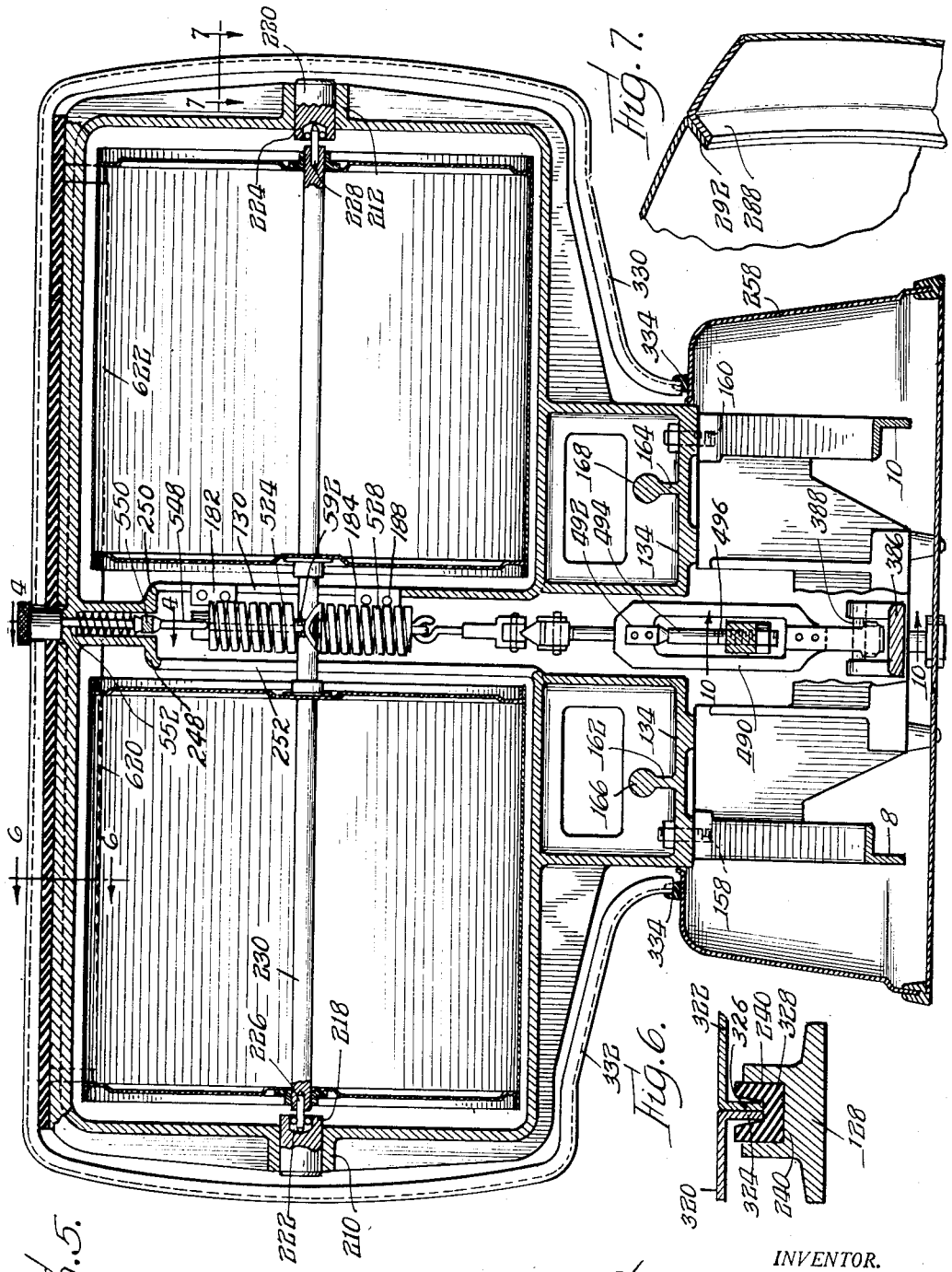
INVENTOR.
Edward C. Karp
BY
Moore, Olson & Trexler
Attys.

Aug. 21, 1951 E. C. KARP 2,565,431
COMPUTING SPRING SCALE
Filed Nov. 5, 1945 8 Sheets-Sheet 4
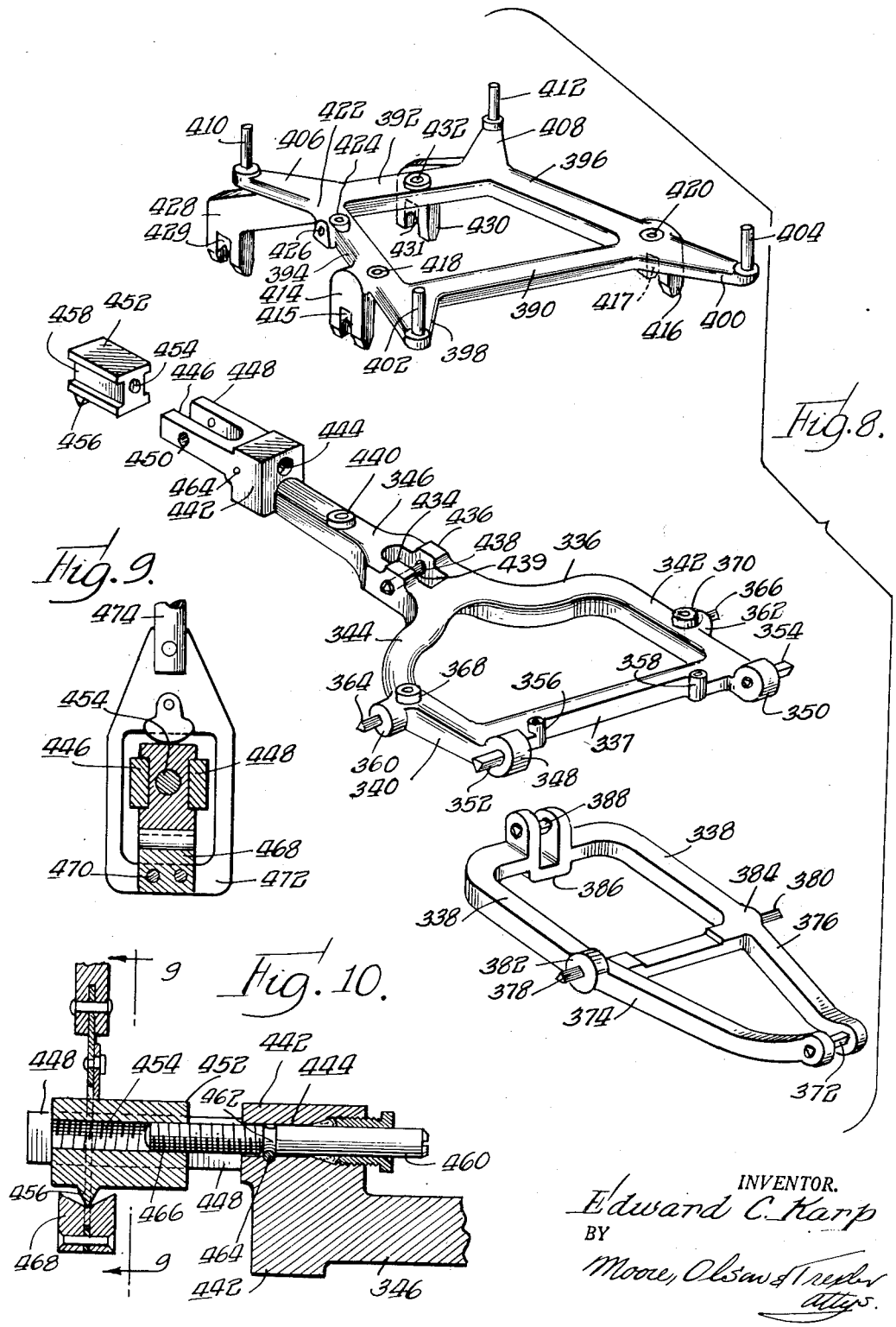
INVENTOR.
Edward C. Karp
BY
Moore, Olson & Trexler
attys.

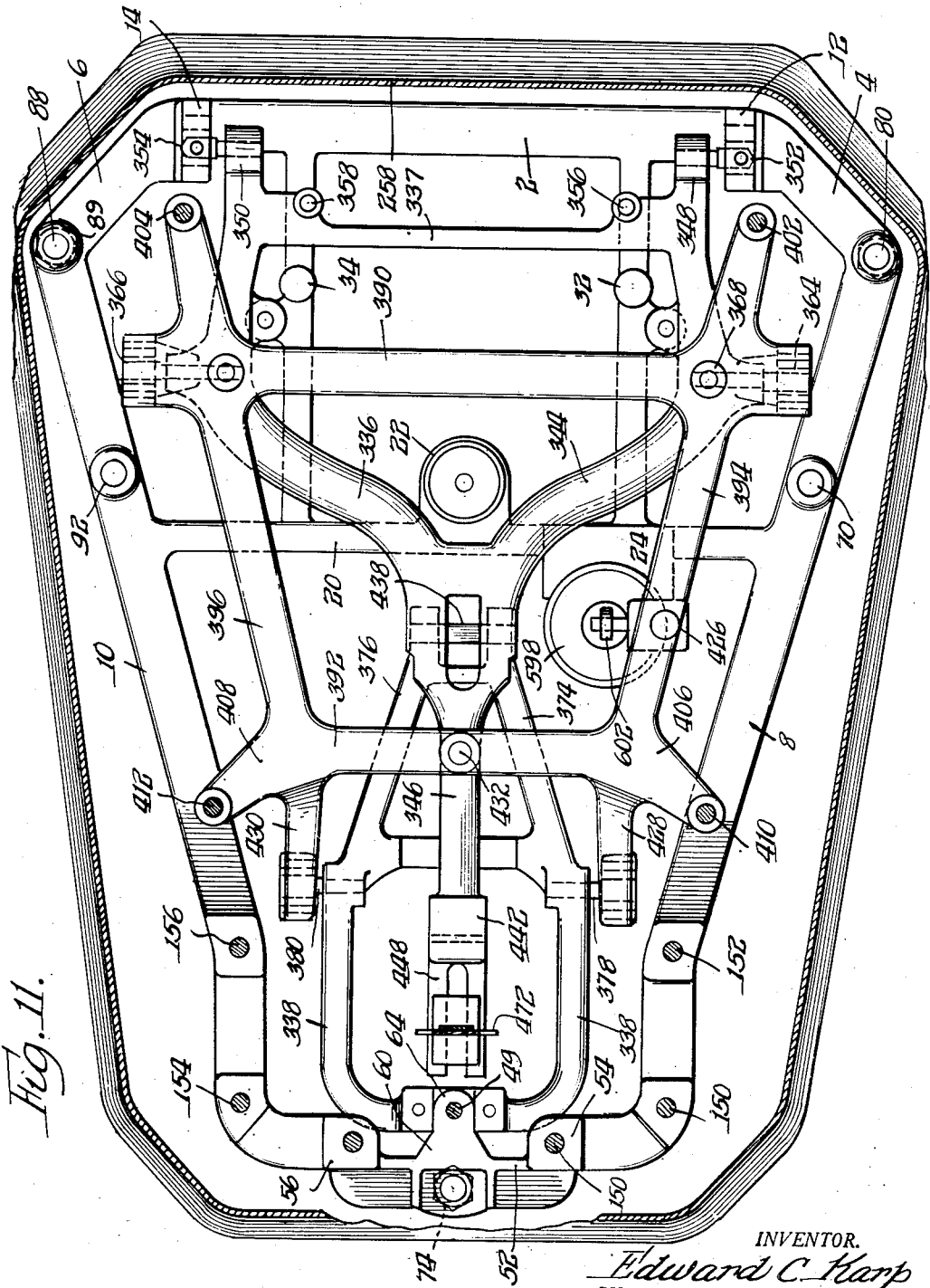

Aug. 21, 1951  E. C. KARP  2,565,431
COMPUTING SPRING SCALE
Filed Nov. 5, 1945  8 Sheets-Sheet 6
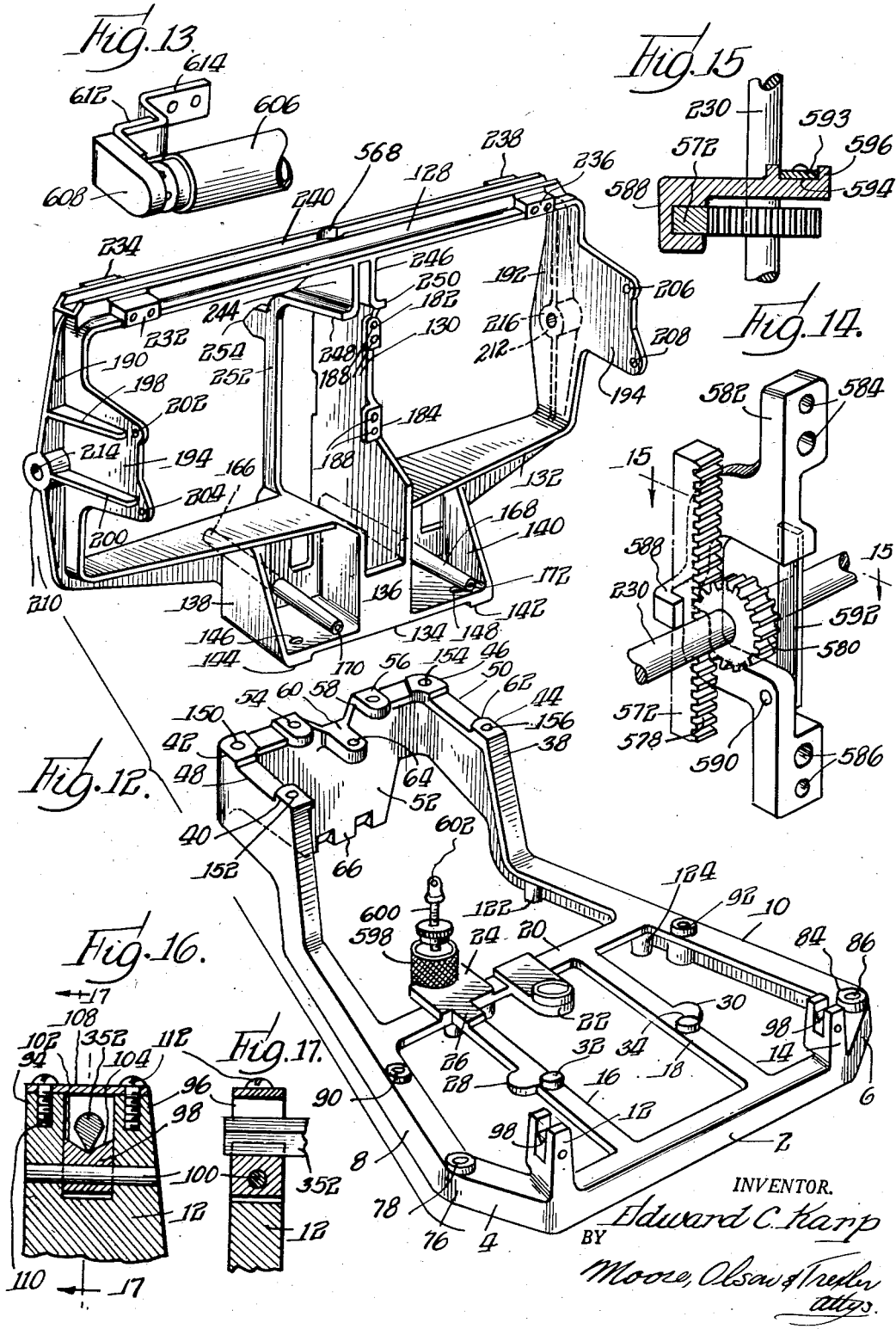
INVENTOR.
Edward C. Karp
BY
Moore, Olson & Trexler
attys.

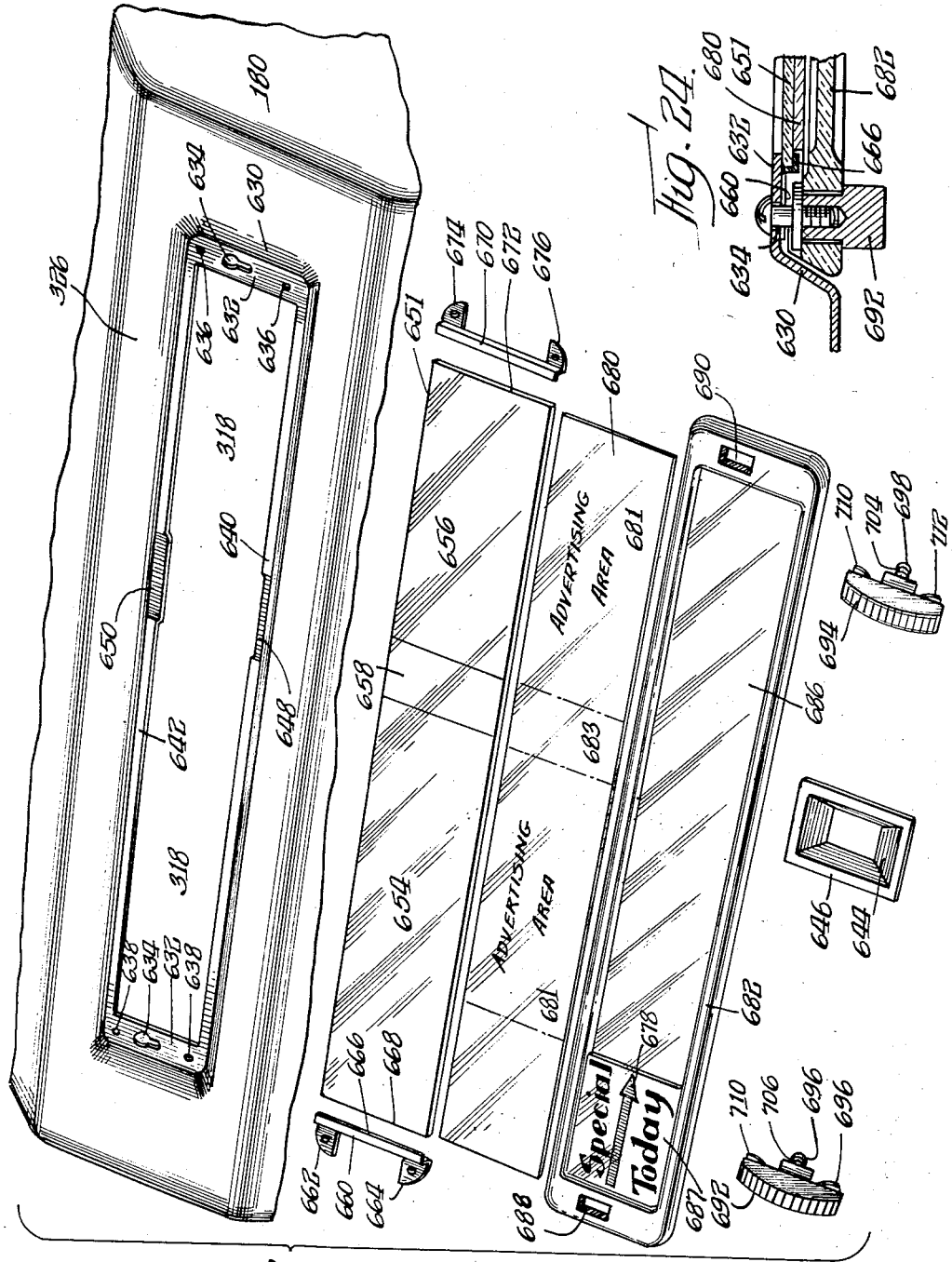

Aug. 21, 1951  E. C. KARP  2,565,431
COMPUTING SPRING SCALE
Filed Nov. 5, 1945  8 Sheets-Sheet 8
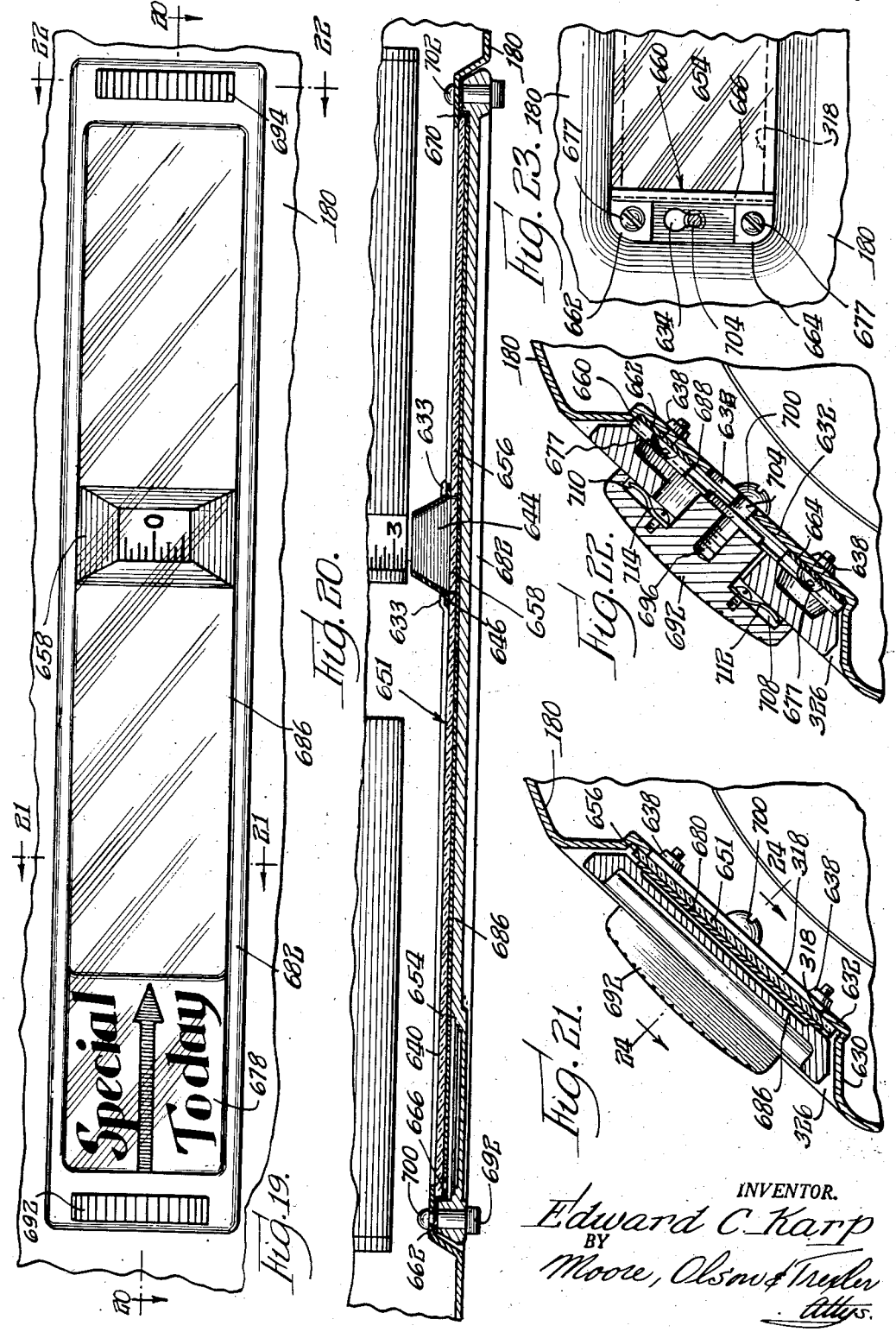
INVENTOR.
Edward C. Karp
BY
Moore, Olson & Trexler
Attys.

Patented Aug. 21, 1951

2,565,431

UNITED STATES PATENT OFFICE 2,565,431

COMPUTING SPRING SCALE

Edward C. Karp, Belvidere, Ill.

Application November 5, 1945, Serial No. 626,838

4 Claims. (Cl. 265—39)

This invention relates to weighing scales and more particularly to an improved computing scale.

Among the objects of the present invention is to provide a computing scale which is in general an improvement on the type of scale disclosed in Patent 2,193,167, issued March 12, 1940.

Another object of the invention resides in providing a scale having basal castings formed of two main castings, one of the castings being formed as a framework or support for the chart enclosing housing and being constructed and arranged to be superimposed upon and supported by a rear elevated portion of the other basal casting, said last mentioned casting being in turn constructed and arranged to receive and support the various levers and scale pan support for interconnection with the spring devices and the mechanism which actuates the chart, whereby a considerable saving in basal construction is effected and whereby a revolutionary change is permitted in the utilization of a single piece base housing and a two piece chart housing which rest directly on the single piece base housing, and whereby all of the operating mechanism and the chart of the scale are enclosed in said housing construction.

Another object of the invention is to provide a scale construction wherein improved adjustable means is provided for adjusting the effective length of the longer lever of the lever system whereby to adjust the capacity of the scale.

Yet another object of the invention resides in providing an improved type of support for the two piece chart housing members wherein the support is channeled to receive a gasket and the edge members of the chart housings at their upper longitudinal meeting edges, in combination with means for fastening the two chart housings in position to each other and to the support by a simple type of fastening member located at the junction of the two piece chart housing and the one piece scale base housing.

Yet another object of the invention resides in the construction of this upper chart housing casting or support and the arrangement and construction of the combination rack guide and chart shaft retainer thereon whereby a simplified and improved arrangement of supporting and guiding means for these elements is provided.

Yet another object of the invention resides in a fluorescent lighting arrangement for the inner portion of the chart housing of the scale.

Still another object of the invention resides in the specific manner of supporting the spring suspension mechanism from the upper portion of the chart housing support whereby the same may be actuated from the exterior of the chart housing.

Still another object of the invention resides in the construction and arrangement of the sight openings in the chart housing support and in their disposition relative to the lighting arrangement whereby the chart is efficiently illuminated while at the same time shielding the observer from the glare of the light source.

Yet another object resides in the improved equalizing yoke to support both the front and back spring, the same being simultaneously adjustable.

Yet another object of the invention resides in providing the three point support for the base of the scale and the manner of adjusting the same.

Yet another object of the invention resides in providing the specific type of linkage mechanism for supporting the knife edge and the V-shaped bearings which support the knife edges.

Yet another object of the invention resides in the two part basal casting members of the scale comprising the low front part and the integral rear upstanding part for supporting the second basal casting on which is mounted the chart enclosing casings.

Yet another object of the invention resides in the mechanism for supporting the chart housings from the central upstanding pedestal of the casting.

Still another object of the invention resides in the construction wherein the front and rear half shells of the chart housing are joined at their flanged intersections and wherein in particular they lie in a channel-shaped groove in the upper part of the transversely extending upper casting and wherein the sides of this casting are free of the V-shaped groove.

Yet another object resides in the specific construction of the sheet metal scale pan.

Another object resides in the construction of the display windows, including therein ease of assembly and removal of parts thereof to permit insertion of a replaceable price or announcement display.

Other and further objects of the invention will be apparent from a perusal of the following specification when taken in connection with the accompanying drawings, wherein:

Figure 1 is a perspective view of the assembled scale;

Figure 2 is a composite perspective view of the sheet metal housing portions of the scale, including the scale pan;

Figure 3 is a longitudinal sectional view taken through the central portion of the scale;

Figure 4 is a detail section taken on the line 4—4 of Figure 5;

Figure 5 is a sectional view taken on the line 5—5 of Figure 3;

Figure 6 is a detail sectional view taken on the line 6—6 of Figure 5;

Figure 7 is a detail sectional view shown in perspective, taken on the line 7—7 of Figure 5;

Figure 8 is a perspective view of the three main lever castings of the scale;

Figure 9 is a section taken on the line 9—9 of Figure 10;

Figure 10 is an enlarged detail sectional view taken on the line 10—10 of Figure 5;

Figure 11 is a plan sectional view taken on the line 11—11 of Figure 3;

Figure 12 is a perspective view of the two main castings that support the housing and the lever and chart mechanism of the scale;

Figure 13 is a detail perspective view of the mounting for one of the fluorescent lights;

Figure 14 is a detail perspective view of the device for mounting the chart shaft in the housing;

Figure 15 is a plan sectional view taken on the line 15—15 of Figure 14;

Figure 16 is a detail sectional view of one of the bearing supports;

Figure 17 is a side sectional view taken on the line 17—17 of Figure 16;

Figure 18 shows the parts of the rear view window in perspective;

Figure 19 is a face view of the rear window;

Figure 20 is a view taken on line 20—20 of Figure 19;

Figure 21 is a view taken on line 21—21 of Figure 19;

Figure 22 is a section taken on line 22—22 of Figure 19;

Figure 23 is a view of the frosted glass retainer; and

Figure 24 is a detail sectional view taken on the line 24—24 of Figure 21.

In general, as shown in Figures 1 and 2, the enclosing housing of the scale comprises a main basal sheet metal portion and two chart enclosing housings, which join with the basal housing portion, and a scale pan. Disposed within and supporting these housing portions are two main support castings for the scale parts as shown in Figure 12. They comprise a horizontal main base casting having at its rear end an upstanding deck which supports a second rear casting, which latter forms a support for the chart mechanism and the vertical reciprocal rack that is connected to the lever system by means of the springs and operates the rotatable chart. In addition, the lever system comprises the elements shown in Figure 8.

Referring now to Figure 12, the main basal casting is formed of a relatively broader front bar-like portion 2 which is preferably tapered rearwardly diagonally as at 4 and 6 to merge into the rearwardly and slightly inwardly extending longitudinal bars 8 and 10. At the junction of the front bar portion 2 and the diagonal bar portions 4 and 6 there are provided upstanding posts 12 and 14 for purposes hereinafter set forth. Intermediate the posts 12 and 14 the front bar 2 is provided with integral spaced apart bars 16 and 18 which merge into a transversely extending bar 20, the ends of which are integral with the longitudinal side bars 8 and 10. This transverse intermediate bar 20 is provided with an integral, forwardly extending flat bracket 22 for the purpose of temporarily supporting a spirit level when adjusting the scale for use, and the bar 20 is likewise provided with a raised, substantially square-like, relatively small platform, the top of which is horizontal as shown at 24. The front of this platform 24 is provided with a forwardly extending tongue 26 the upper surface of which lies above the plane of the bar 16. The bar 16 is provided with an outwardly extending arcuate extension 28 and the bar 18 is provided with an oppositely extending arcuate extension 30. The bar 16 is provided with a circular disc-like lug on its top surface, such as 32, and the bar 18 is provided with a similar disc-like upstanding lug 34, for purposes hereinafter set forth. The bars 8 and 10 each at their rear ends extend vertically upwardly as at 38 to provide at their top sides the horizontal lug portions 40 and 42 at one side and 44 and 46 on the opposite side. The intervening uppermost portions 48 and 50 between the lugs 40 and 42 and 44 and 46 are on a lower plane, as shown in Figure 12. The rear of the main basal casting provides a generally vertically extending plate 52. At its top edge it is provided with spaced horizontally extending lugs 54 and 56 on opposite sides of the central portion and intervening between the corner lugs 42 and 46. From the lugs 54 and 56 to a central point between the same the rear part of the bar extends downwardly as at 58 to provide a forwardly projecting lug 60 which is at a considerably lower level than the horizontal top surfaces of the lugs 40 and 42, 54, 56, 46 and 44, all of which are in a common plane. The forwardly projecting lug 60 is provided with a threaded opening 64 for purposes hereinafter set forth. As best appears in Fig. 3, the bottom wall of the vertical wall 52 is provided with a rearward extension 66. The bottom 68 of this extension lies substantially in the plane of the underside of the bars 2, 8 and 10. This extension 66 is provided with a vertically threaded aperture 70 to receive the threaded shank 72, the bottom of which provides a supporting foot 74. This shank 72 is located in the central portion of this rearmost wall 52 so that the foot 74 is disposed centrally of the rear portion of the main casting 2. The front portion of the casting carries two adjustable feet, for instance, the bars 4 and 8 at their junction, as at 76, are provided with an integral raised portion suitably bored as at 78 to receive a vertically depending threaded post 80 provided on its bottom with a foot 82, and in a similar manner the opposite corresponding portion of the post is provided with a raised upstanding boss 84 bored as at 86 to receive a threaded depending post 88 (Fig. 11) likewise provided on its bottom with a suitable foot 89. In addition, the parts 8 and 10 are provided with the raised and bored upstanding bosses 90 and 92, for purposes hereinafter set forth. The upstanding posts 12 and 14 formed on the front part of the bar 2, as shown in Figures 16 and 17, terminate in bifurcations 94 and 96 (Figure 16) to receive therebetween a saddle 98 held in position by a pin 100 passing through registering borings in the bifurcations 94 and 96 and in the saddle 98. The upper portion of this saddle has converging, angularly disposed walls 102 and 104 to support a knife edge 352. A plate 108 is secured by screws 110 and 112 onto the top of the bifurations 94 and 96 to hold the knife edge 352 in position. The opposite post 14 is similarly constructed.

In addition, the undersides of the bars 2, 8 and 10 are provided with a series of downwardly extending, integrally formed, intermediate feet 114, 116, 118, 120, 122, and 124, which serve to hold the bar in horizontal position pending the time that the same may be adjusted by means of the three feet 74, 82 and 89.

The second or upper main casting is shown in perspective in Figure 12. In general it is formed with an upper hollow rectangular frame 128, which frame is formed centrally with a transversely disposed and centrally located partition 130 which acts as a support, as hereinafter set forth. In addition, the bottom portion 132 of this frame is provided with a central depending box-like extension having a bottom wall 134, a vertical front wall 136 and side walls 138 and 140. The underside of the bottom wall 134 is provided with the spaced elongated lugs 142 and 144 which extend from front to back to provide horizontal support surfaces by which the upper main frame rests upon the horizontal upstanding lugs 40, 42, 44 and 46 of the bottom frame. The perforation 146 and another perforation 148, together with companion perforations which do not appear in the drawings, formed through the bottom wall 134 of this box-like extension and through the lugs 142 and 144 are adapted to register with openings 150, 152, 154 and 156 formed in the surfaces 40, 42, 44 and 46 whereby to receive fastening screws 158 and 160, see Figure 5, whereby to bolt the main frame to the rearmost portion of the bottom frame. The bottom wall 134 of this upper frame is provided with two upstanding castings 162 and 164 which are generally cylindriform as at 166 and 168, (Fig. 5) thus providing elongated tubes extending forwardly and backwardly and parallel with the wall 130 in spaced relation on either side of the central portion of the frame 128. (See Fig. 12.) The front and rear ends of these elongated tubes 166 and 168 are bored as at 170 and 172 to receive fastening screws 174 and 176 (Fig. 3) which serve to hold in position the front and rear halves 178 and 180 (Fig. 1) of the casing for the rotatable chart as shown in Figure 3, and which will hereinafter be more fully referred to. In addition the wall 130 at its front is provided with angularly disposed, spaced apart lugs 182 and 184 each of which is suitably apertured as at 188 for purposes hereinafter set forth. In addition, the two vertical sides of the frame 190 and 192 are provided with forwardly extending plates 194 strengthened by spacing ribs 198 and 200, which are identical in each plate, and the forward edges of which are provided with perforations 202, 204, 206 and 208, for purposes hereinafter set forth. So also each end plate 190 and 192 is provided with a hub or circular boss 210 and 212 suitably apertured as at 214 and 216 to receive cylindrical inserts 218 and 220 (Figure 5), the inner ends of which are formed with countersunk seats 222 and 224 for the reception of pins 226 and 228 on the opposite ends of the chart shaft 230. The front and rear edges of the upper frame member 128 are provided with forwardly and backwardly extending flat-faced lugs 232, 234, 236 and 238 which are provided with spaced perforations to receive fasteners, and in addition the front top edge of this upper frame member 128 is provided with an elongated, relatively wide slot 240 intersected by a vertical bore 242, and the other side of the wall 128 opposite this bore is provided with a pair of integrally formed parallel extending plates 244 and 246 which are spaced apart and at their bottom edges are provided with oppositely, outwardly extending horizontal flanges 248 and 250 which extend rearwardly and merge into a vertical wall 252 which is provided on its upper portion with a rearwardly extending pointed lug 254.

By reference to Figures 1 and 2 it will be seen that cooperating with the lower base casting and the upper base casting shown in Figure 12 are two main housings comprising a basal housing and a two part chart housing. The three housing members are formed of relatively heavy gauge sheet metal. The base housing comprises a top, relatively flat, horizontal portion 256 and an integral depending skirt 258 completely surrounding all sides of the housing and configured appropriately to correspond with the general shape of the main base casting 2. This housing skirt is preferably provided with a rim or bottom bead 260 (Fig. 3) formed of desired material and slotted as at 262 to receive the lower edge of the skirt 258. This rim is provided with a countersunk seat 264 to receive a sheet metal closure 266 for the bottom of the scale, and which closure is provided with a series of openings through which the feet 74, 82 and 89 and the smaller supports 114 and 116 et cetera project. This closure forms a dustproof bottom for the scale housing. The top of the base housing is provided with a relatively large opening 267 and four relatively small openings 268, 270, 272 and 274 associated therewith and through which the pan supporting posts are adapted to project, as shown in Figure 3. In addition, the top portion of the basal housing is provided with another opening 276 to the rear of opening 267 through which various elements of the weighing mechanism are adapted to connect through the upper housing into the connected weighing mechanism housed in the lower housing 258.

The two chart housings 178 and 180 are shown in perspective in Figure 1 and in section in Figures 3 and 5. Each comprises a relatively heavy gauge sheet metal member of a general shape conforming to one half of the space to be enclosed. In general each one half is elongated in a horizontal direction as viewed in Figure 1 and is provided with end plates 278 and 280, 282 and 284 (Figure 2). Each one of the free edges of the end plate is bent transversely to provide a right angled flange such as 286, 288, 290 and 292. At the basal portion of each one of these half housings these flanges 286, 288, 290 and 292 continue as at 294, 296, 298 and 300 and terminate at an opening 302 and 304 formed in this bottom portion. The metal of the housing at the opening is perforated as at 306, 308, 310 and 312 for the reception of the fastening screws 174 and 176 hereinbefore mentioned. The half housing 178 is provided preferably with the elongated chart window 314 while the opposite half chart housing 180 is provided with the single elongated window 318. In addition the upper edges 320 and 322 are provided with depending flanges 324 and 326 extending at right angles thereto as shown in Figure 6, so that when these two housings 178 and 180 are brought together the flanges will be in juxtaposition and will lie within a countersunk groove formed in a resilient or dustproof packing or sealing strip 328 which lies in the slot 240 of the upper frame member 128, see Figure 6. In a similar manner, when the two chart half housings are fastened together, the flanges 288 and 292, 286 and 290, 294 and 298, 296 and 300 will be juxtaposed in the manner shown in Figure 7 to effect a tight joint therebetween, which joint between the flanges will extend all along the top, along the sides, and along the undersurfaces 330 and 332 (Fig. 5). The lower edges of the scale parts are adapted to be sealed by means of a preferably flexible bead or sealing strip 334 which surrounds the opening 276 of the base 258 whereby to effect a dustproof, noiseless joint. As hereinbefore mentioned, at the bottom the edges of the two housings are held in position by means of the screws 174 and 176 passing into threaded openings in the ends of the tubes 166 and 168. Because of the upper slot 240 and the flanged interlock 324 and 326, as shown in Figure 6, at the top, and the fastening screws 174 and 176 at the bottom, there being a plurality of such screws, the two chart housings will be firmly held in position to enclose the upper part of the weighing mechanism and the rotatable chart and the lighting mechanism hereinafter described.

The weighing mechanism comprises a lever system shown particularly in Figure 8, cooperating with the resilient weighing means comprising preferably helical springs as shown in Figure 3, cooperatively connecting with the lever system, plus the indicating means comprising a dial, a chart and a pointer, one of which indicating elements is mounted stationarily in the upper casing and the other being rotatably mounted and drivingly connected with the lever system.

The lever system is mounted on the support frame 2 and housed within the basal housing 258. The lever system comprises the interconnected lever elements 336 and 338, the former of which is fulcrumed on the front basal frame 2. The lever element 336 specifically comprises a front bar 337, two side bars 340 and 342, and a yoke-shaped rear bar 344 which merges at its central point into a rearwardly extending, elongated lever element 346. At the front corners of the front bar 337 there are two preferably circular bosses 348 and 350 suitably perforated to receive knife edges 352 and 354 horizontally disposed with the knife edges downwardly extending. In addition the front bar 337 is provided with the vertically perforated lugs 356 and 358 to receive fastening means hereinafter set forth. The side bars 340 and 342 are each provided with circular, laterally extending lugs 360 and 362 each in turn perforated to receive and retain a knife edge 364 and 366. So also each side frame 340 and 342 is provided with a vertically perforated upstanding boss 368 and 370. The lever 338 is formed with a knife edge at its front or at one end, as indicated at 372, and is provided with two elongated sides 374 and 376 each formed midway of its length with the knife edges 378 and 380 which extend out horizontally from rounded bosses 382 and 384 formed in the side bar members of this lever. At its opposite end the lever is formed with a sort of clevis or stirrup 386 which at its upper end carries a knife edge 388. The knife edges 388, 378, 380 and 372 all extend horizontally. In addition there is provided a platform supporting frame or casting 390 which is of substantially square-shaped skeletonized form, having a front bar, a rear bar 392, two side bars 394 and 396. The front bar 390 has two forwardly diagonally extending legs 398 and 400 each of which carries at its forward corner an upstanding post 402 and 404. In like manner the rear bar 392 has two outwardly diagonally extending legs 406 and 408, each of which is provided with an upstanding post 410 and 412.

The two side posts 394 and 396 each have depending therefrom inverted knife bearing supports 414 and 416, and likewise have a threaded perforation 418 and 420 adjacent said bearing supports. In addition, that portion 422 of the side bar 394 is provided with a vertical threaded aperture 424 and a laterally disposed threaded aperture 426. Each one of the diagonally disposed arms at the rear of the standard, such as 406 and 408, is likewise provided with depending knife bearing supports such as 428 and 430, and there is in connection with the latter bearing support a vertically threaded bore 432. The lever portion 346 is provided with spaced bearings 434 and 436 which are provided with transverse openings 438 to receive a horizontal knife bearing 439 (see Figure 3), and the portion 346 is likewise provided with a vertically disposed bore 440 intermediately of the knife bearing and its opposite end which terminates in an integral block-like portion 442 suitably bored and threaded as at 444. The block-like portion 442 is provided with furcated spaced apart portions 446 and 448 likewise transversely threaded as at 450 to receive a sliding adjustable block 452 which in turn is threaded as at 454 to receive an adjusting rod which passes through the threaded opening 444. The block 452 is provided with a depending knife edge 456, see Figure 10, on its underside. The block 452 is provided with a dovetailed cut-out 458 on each side whereby it may slidingly and adjustably fit in between the furcations of the block 442.

A turnable rod 460 is inserted in the opening 444 of the block 442. The rod 460 carries a groove 462 in which fits a pin 464 passing through the sides of the block 442 to hold the rod from longitudinal movement while permitting its rotation. The threaded portion 466 of this rod threads into the threaded opening 454 of the adjustable block 452 so that by turning the end 460 of this rod the block 452 is shiftable relatively to the block 442 carried by the lever 346. This provides an adjustment for the effective length of the lever 336, that is, an adjustment for the distance between the knife edges 352 and 354 and the knife edge 456. This adjustment governs the capacity of the scale.

Referring now to Figure 3 of the drawings, it will be seen that the main lever 336, seen in Figure 8, is supported by means of knife blades 352 and 354 resting upon the hardened V-bearings 98 of the upstanding posts 12 and 14, see Figures 12 and 16. This supports the front end of the lever 336. The rear end of this lever is supported by the knife edge 456 on the underside of the block 452 carried in a V-bearing 468 pinned as at 470 to a stirrup 472 carried on the lower end of a rod 474 as hereinafter more fully described. Thus this lever 336 is supported at two spaced corners on its front end and centrally at its rear end. This lever in turn supports the smaller lever 338, see Figure 8, by means of a knife edge 372 mounted on the front end of lever 338 and supported by a V-bearing block 476 carried by a link 478 on an upper V-bearing block 480 which is in turn carried by the knife edge 439 which in turn is carried in the bearings 434 and 436 formed in the central part of the lever 336 (see Figure 3). The rear end of this lever 338 is carried by a stirrup 486 the top of which bears a depending knife edge 388, resting in a V-bearing block 482 mounted in a second stirrup 484 which latter stirrup is rigidly carried by a relatively long apertured link 490 (see Fig. 5), the upper end of which carries rigidly fixed thereto a depending cone bearing 492 which is pivotally mounted in the V-shaped upper end of a rod 494. This rod is provided with a threaded portion 496 screwing into a threaded opening in the forwardly projecting part 60 of the vertical plate 66 of the main base casting 2 so that the rod 494 is stationary but vertically adjustable on the base of the scale and serves as means for vertically adjusting the position of the link 490 and hence the vertical position of the lower stirrup 484 and its V-shaped bearing and hence of the knife edge 388 pivotally resting thereon, and hence the vertical position of the rear end of the lever 338.

The pan support shown in the top view of Figure 8 is mounted upon the two levers 338 and 336. Referring now to Figure 3, the depending bearing support 428 carries the inverted V-block 429 which rests upon the knife edge 378 of the shorter lever 338, and the depending bearing support 430 carries an inverted V-block 431 which is supported upon the knife edge 380 of lever 338 (see Figure 8). The bearing support 414 carries an inverted V-block 415 which rests upon the knife edge 364 on the arm 340 of the longer lever 336 and the bearing support 416 carries an inverted V-block 417 which rests upon the knife edge 366 of the arm 342 of the longer lever 336. The upstanding posts of the pan support 390 carry a sheet metal pan of the construction shown in Figures 1, 2 and 3. Thus the pan 498 is formed of a sheet metal, relatively flat platform. The pan 498 is provided with a generally central, slight concavity 500 and at one end is provided with a depending skirt 502 and at the opposite end is provided with an upturned wall 504 which is of sufficient upward extent to prevent any commodity on the scale pan 498 contacting the wall 178 of the chart housing. The outer end of the upstanding wall 504 is provided with the strengthening rib 506 and the wall curves downwardly as at 508 and merges into the bottom portion 498. In addition the curved portion 508 of the pan is provided with sheet metal leg brackets or clips 510 which are welded thereto as at 512 and 515. The clips 510 extend from the walls 508 and form a flat seat 514 for the top surface of the post 410. The clip 510 is duplicated on the opposite side of the pan. The pan is provided with a pair of brackets 516 welded onto the side thereof, which brackets are each provided with an extended portion 518 an opening for the reception of the posts 402 and 404. These posts pass through the openings in the brackets 516 and the upper surface of the post engages the undersurface of the pan 498. Thus the pan cannot move laterally with respect to the upstanding posts. A sheet metal cover plate 522 fits over the opening 207 between the scale pan posts to keep dust and dirt away from the operating mechanism.

As hereinbefore mentioned, the knife blade 456 on the end of the long lever 336 is mounted on the bearing 468 carried by the depending rod 474 and this in turn is suspended on resilient weighing means which preferably comprises a helical spring 524 interconnected as at 526 to another helical spring 528. There is another spring 530 interconnected as at 532 to a lower spring 534. The lower portion of the spring 528 is connected by means of a hook 536 and the lower portion of the spring 534 is connected by means of a hook 538, the hook portions being each connected to a cross bar 540 fastened as at 542 to the upper portion of the rod 474. The upper portion of the spring 524 is connected by means of a hook 546 and the upper portion of the spring 530 is connected by means of a hook 548 to a cross bar 550 which cross bar in turn is connected to a rod 552 passing loosely through an opening 242 in the upper frame 128 of the upper casting (see Fig. 4). A coil spring 556 is confined between the bottom portion of this frame and the upper portion of the cross bar 550 to prevent play. The upper end of the rod 552 is threaded as at 558 to engage a threaded opening 560 in a nut 562 having a turning slot 564 in its top. This nut rests within a sleeve 566 fitting in a circular well 568 in the top of the slot 240 of the frame 128. The upper portion of the sleeve 566, which passes through an opening in the sheet metal cover 322, is threaded to receive a cap 570. Thus the position of the cross bar 550 may be adjusted by means of the rod 552 and this adjustment may be accomplished without taking the two chart half casings apart by simply removing the cap 570 and inserting a screwdriver in the slot 564.

Chart rotating means is provided for rotating the chart by movement of the cross bar 540. To this end a rack 572 is fastened as at 574 to a supplementary cross bar 576 on the top surface of the rod 474. This rack has teeth 578 meshing with a pinion 580 mounted on the chart shaft 230. A rack guiding bracket 582 (see Figure 14) is provided with upper and lower fastening holes 584 and 586 whereby it is attached to the lugs 182 and 184 respectively by means of the holes 186. The bracket 582 is provided with a rack guide 588 which is configured to receive the back of the rack to keep it in vertical position. In addition, the rack guide is provided as at 590 with a spring retainer 592 which rests in a pocket 594 formed on the portion 596 of the rack guide to press resiliently against the shaft and thus to keep the pinion 580 in meshing engagement with the teeth of the rack 572. This spring may be displaced by moving it outwardly away from its socket and then swinging it about the pin 598 as a pivot. Then by retracting the inserts 218 and 220 the chart and its shaft and pinion may be removed from the housing.

The base casting 2 is provided with a dashpot 598, the upper portion of which is provided with a pivoted link 600 which in turn is connected to the platform supporting frame 390 at 426 by the element 602 for the purpose of damping movement of the lever system under the weight of the platform applied for measurement.

A pair of elongated cylindrical fluorescent lamps 604 and 606 (see Figure 3) each have their opposite ends mounted in sockets 608 and 610 carried by a right angle bracket 612 (Figure 13) mounted on another bracket 614 that passes to the lugs 232, 234, 236 and 238. These lights are thus mounted directly under the top of the chart housing between the rounded portions 616 and 618 thereof.

A pair of rotatable charts 620 and 622 are mounted, as hereinbefore mentioned, on the common shaft 230. It will be noted that the spring mechanism 524 and 528 shown in Figure 5 is disposed between the two charts.

By referring to Figure 3 it will be noted that one of the openings in the chart housing which corresponds to the openings 314 seen in Figure 1 and the left hand side of Figure 2, is disposed so that the operator of the scale can view the indicia to determine the proper weight and price. In addition, the opposite side of the chart housing has an opening 318 which, as shown in Figures 18 to 23 inclusive, is arranged to not only permit the purchaser to observe the indications on the chart, but also to replaceably receive any advertising matter, including the price of a daily special.

The opening 314 is closed by suitable glass whereas the opening 318 is closed by the construction illustrated in the drawings. Referring more particularly to Figure 18, the chart housing 180, and particularly the upper portion thereof, is provided with an indented portion 630 providing an inwardly extending flange 632 which flange is provided at spaced ends, as at 634, with a keyhole slot and with upper and lower fastener holes 636 and 638. In addition, the flange at 640 and 642 is still further indented as at 648 and 650 to receive an aperture window 644 likewise having an outwardly extending flange 646 which is adapted to lie in the depressed portions 648 and 650. This member 644 comprises a back weight sight aperture the flanges of which are adapted to lie on the depressions 648 and 650 of the lower and upper flanges 640 and 642 whereby this back weight aperture is precisely put in position because it seats upon the countersunk flanges 648 and 650 formed in the chart casing 180.

A single piece of glass, or similar medium, 651, shown in Figure 18, has its two extreme portions 654 and 656 frosted or translucent and with an intermediate portion 658 clear. The clear glass will overlie the back weight aperture and the frosted glass will overlie the portions 318 on opposite sides of the back weight aperture. This piece of glass is held in position by the glass holders comprising a clip 660 having outstanding perforated ears 662 and 664 and a flange 666 which overlies the edge 668 of the piece of glass, and the opposite clip is similarly constructed and has a flange 670 which overlies the edge 672 of this piece of glass. It has similarly perforated ears 674 and 676. These glass holders are held in place by fastening means passing through the fastener holes 636 and 638 in the flanges 632 whereby this elongated rectangle of glass is held firmly in position. A translucent strip daily sign, such for instance as the translucent strip 680 carrying suitable advertising indicia in the print carrying areas 681, and intermediate these areas 681 is a relatively small area 683 that corresponds to the space that is directly over the member 644 through which the customer views the chart. The strip 680 is placed to overlie the frosted glass portions 654 and 656. A plastic frame 682 overlies the printed areas 681 and the clear area 683. This frame comprises a transparent window 686 and a translucent end area or window 687 carrying the words "Special Today," and an arrow pointing to the window 686. The ends of the frame as at 688 and 690 are slotted to receive the fastening handles 692 and 694. These handles have inwardly extending pins 696 and 698 which are adapted to be inserted through the slots 688 and 690 and these pins have enlarged heads, such as 700 and 702 (Figs. 20 and 22), whereby when the handles are in position and are moved downwardly the shanks 704 and 706 will engage the smaller end of the bayonet joint and secure the frames in position so that on looking through the window 686 one will see opposite the illuminated words "Special Today," that part of the weight chart immediately beneath the areas 683 and 658 and through the weight aperture 644, and will also see the illuminated translucent or printed signs 681. As will be apparent from Fig. 22, the undersides of the handles 692 and 694 are cut away as at 708 and 710 to receive leaf springs 712 and 714 which bear against the outer face of the plastic frame member 682, whereby clampingly to hold the frame in position.

Obviously the invention is not limited to the specific details of construction disclosed herein but is capable of other modifications and changes without departing from the spirit and scope of the appended claims.

Having thus described the invention, what is claimed as new and desired to be secured by Letters Patent is:

1. In a scale, the combination of a casting support having a substantially low horizontal forward portion and an upwardly extending rear portion, said upstanding rear portion supporting a second casting including a central member and oppositely extending, spaced apart side frame members, said side members including registering bearings, a shaft in said bearings and a drum on said shaft, said central member carrying a vertical bracket, a rack guide mounted on said bracket, a rack vertically slidable in said rack guide, a pinion on said shaft engaging the teeth of the rack, a leaf spring pivotally mounted on said bracket, means on said bracket detachably engaging said leaf spring to hold said spring resiliently pressing against said shaft, a cross bar carried by the upper portion of said second casting, spring tension means connected to said cross bar, a lower cross bar connected to said spring tension means, a lever system mounted on the lower horizontal portion of said casting support, a scale pan disposed upon said lever system, and means connecting said lower cross bar with said rack and with said lever system.

2. In a scale, the combination of a casting support having a substantially low horizontal forward portion and an upwardly extending rear portion, said upwardly extending rear portion supporting a second casting having upstanding frame members extending laterally in opposite directions transversely of the longitudinal axis of the low portion, said members including an upper frame member and a central vertically disposed partition, said upper member having an aperture formed therein in registration with the central portion of said vertically disposed central partition, a lever system mounted on the low horizontal portion of the casting support and a scale pan disposed upon the lever system, an upper cross bar, a bolt passing through the central opening of said upper frame member, and means for adjusting said bolt, said bolt connecting with the central portion of said upper cross bar, the outer ends of said cross bar having spring means connected thereto, a lower cross bar, means connecting the lower ends of said spring means to said lower cross bar, a shaft turnably mounted in said laterally extending frame members, a pinion on said shaft, a drum on said shaft, a rack connected to move with said lower cross bar and engaging the teeth of said pinion, and means connecting the lower cross bar with the lever system.

3. In a scale, the combination of a casting support having a substantially low horizontal forward portion and an upwardly extending rear portion, said upwardly extending rear portion supporting a second casting having upstanding frame members extending laterally in opposite directions transversely of the longitudinal axis of the low portion, said members including an upper frame member and a central vertically disposed partition, said upper frame member having an aperture formed therein in registration with the central portion of said vertically disposed central partition, a lever system mounted on the low horizontal portion of the casting support and a scale pan disposed upon the lever system, an upper cross bar, a bolt passing through the central aperture of said upper frame member, said bolt being connected to the central portion of said upper cross bar, spring means connected to the outer ends of said upper cross bar, a lower cross bar, means connecting the lower ends of said spring means to said lower cross bar, a shaft turnably mounted in said laterally extending frame members, a pinion on said shaft, a drum on said shaft, a rack connected to move with said lower cross bar and engaging the teeth of said pinion, means connecting the lower cross bar with a part of the lever system, and housing means enclosing said laterally extending members of said upwardly extending portion of said casting support, said housing members having an opening therein registering with the aperture in the upper frame member of said laterally extending frame members, and means passing through said housing means for adjusting said bolt from a point outside of said housing means to simultaneously adjust the tension of both of said spring means connected to said cross bars.

4. In a scale, the combination of a support casting having a substantially low horizontal forward portion and an upwardly extending rear portion, said upwardly extending rear portion supporting a second casting having a central upstanding column and spaced laterally and oppositely extending frame members projecting transversely of the long central axis of the supporting casting, the top of said oppositely extending members comprising a channelled upper frame, the bottom portion of said upstanding column of the second casting having a rectangular base resting upon a similar shaped top of the rear raised central portion of the support casting, a lever system mounted upon the low portion of the support casting including a centrally disposed long lever pivoted at the front of the support casting and having a free end disposed centrally of the rear of said support casting, cooperative lever mechanism pivotally connected to said relatively long lever, suspension means carried by the channelled upper frame of said transversely projecting frame members, including tension means and a rack operated thereby, a shaft mounted in the transversely projecting frame members of the upstanding column, a drum mounted on said shaft and a pinion mounted on said shaft meshing with the teeth of said rack, a connection from the bottom of said suspension means and said rack to the elongated lever of the lever system, and guide means mounted upon the central upstanding column for guiding the rack in its vertical movement.

EDWARD C. KARP.

REFERENCES CITED

The following references are of record in the file of this patent:

UNITED STATES PATENTS

| Number | Name | Date |
|---|---|---|
| 1,231,952 | Sewall | July 3, 1917 |
| 1,495,337 | Ludlow | May 27, 1924 |
| 1,498,936 | Stimpson | June 24, 1924 |
| 1,635,661 | Craig | July 12, 1927 |
| 1,802,558 | Jaenichen | Apr. 28, 1931 |
| 2,193,167 | Farwell, 3rd, et al. | Mar. 12, 1940 |
| 2,287,814 | Meeker et al. | June 30, 1942 |
| 2,311,264 | Stimpson et al. | Feb. 16, 1943 |